United States Patent [19]
Roy

[11] Patent Number: 5,451,297
[45] Date of Patent: Sep. 19, 1995

[54] TREATMENT OF AUTOMOBILE SHREDDER RESIDUE BY VACUUM PYROLYSIS

[75] Inventor: Christian Roy, Sillery, Canada

[73] Assignee: Universite Laval, Quebec, Canada

[21] Appl. No.: 120,232

[22] Filed: Sep. 14, 1993

Related U.S. Application Data

[63] Continuation of Ser. No. 881,878, May 12, 1992, abandoned, which is a continuation-in-part of Ser. No. 725,683, Jul. 3, 1991, abandoned.

[51] Int. Cl.$^6$ ............................ C10B 53/00; C22B 1/00
[52] U.S. Cl. ........................................ 201/25; 201/21; 201/30; 201/35; 585/241
[58] Field of Search .................... 201/3, 8, 21, 25, 30, 201/35, 39; 585/241; 202/227, 262

[56] References Cited

U.S. PATENT DOCUMENTS

| | | | |
|---|---|---|---|
| 3,780,676 | 12/1973 | Hazzard et al. | |
| 4,052,265 | 10/1977 | Kemp | 201/25 |
| 4,084,521 | 4/1978 | Herbold et al. | 201/35 |
| 4,235,676 | 11/1980 | Chambers | 201/21 |
| 4,474,524 | 10/1984 | Kawakami et al. | 201/25 |
| 4,740,270 | 4/1988 | Roy | 201/35 |
| 4,839,151 | 6/1989 | Apffel | 201/3 |

FOREIGN PATENT DOCUMENTS

| | | | |
|---|---|---|---|
| 0067139 | 12/1982 | European Pat. Off. | |
| 2925202 | 1/1981 | Germany | |
| WO88/08020 | 10/1988 | WIPO | 201/21 |

Primary Examiner—Karen M. Hastings
Attorney, Agent, or Firm—Foley & Lardner

[57] ABSTRACT

Metals are recovered from automobile shredder residue by subjecting the shredder residue to vacuum pyrolysis to produce non-condensable gases, condensable hydrocarbon vapors and water vapor, and a solid residue containing non-oxidized metals and a carbonaceous material. The vacuum pyrolysis is carried out at a temperature in the range of about 450° to about 650° C., under a subatmospheric pressure in the range of about 50 to about 200 mm Hg so as to thermally decompose and substantially completely vaporize organic matter adhered to the metals. At least one metal is separated from the solid residue, the metal being recovered in nonoxidized and substantially carbon-free form suitable for direct recycling.

21 Claims, 1 Drawing Sheet

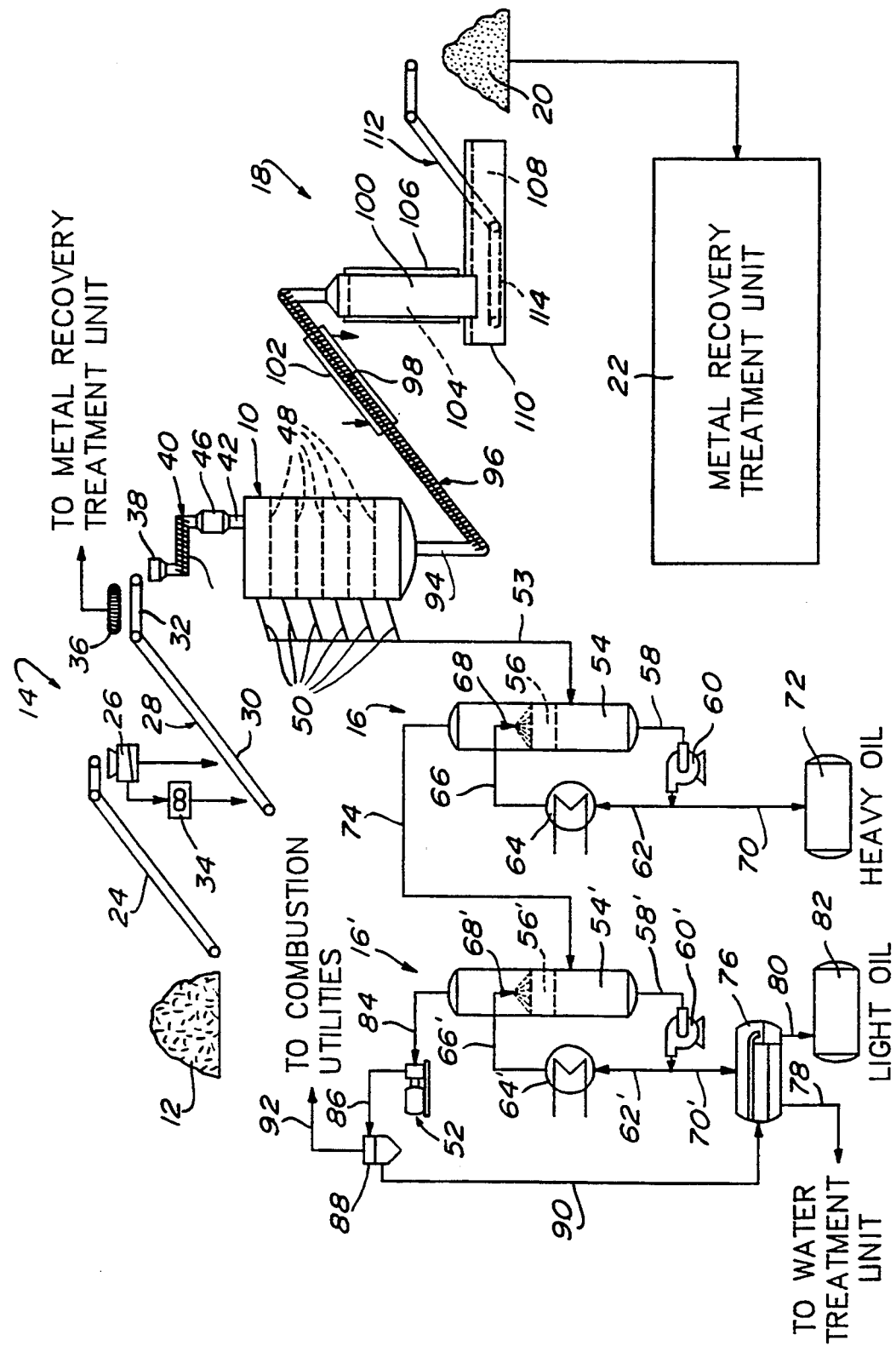

TREATMENT OF AUTOMOBILE SHREDDER RESIDUE BY VACUUM PYROLYSIS

CROSS REFERENCE TO RELATED APPLICATIONS

This application is a continuation of application Ser. No. 07/881,878, filed May 12, 1992, which is a continuation-in-part of application Ser. No. 07/725,683 filed Jul. 3, 1991, both of which are abandoned.

BACKGROUND OF THE INVENTION

The present invention relates to improvements in the field of waste reclamation. More particularly, the invention is directed to the recovery of commercially valuable products from automobile shredder residue.

The automobile industry, in its effort to meet stringent automobile fuel economy standards by manufacturing light weight automobiles, has selected plastics to replace heavier metals as the construction material for numerous components. Generally, the life of an automobile is 9 to 10 years, at which time it is dismantled and/or shredded into ferrous and non-ferrous metals and shredder residue.

Automobile shredder residue is the remaining material after the shredding and demetallizing process. It is composed of rubber, glass, fabric, plastics, insulation, fibrous items, stones and dirt. Generally, the inorganic matter content of automobile shredder residue ranges from about 35 to about 65 weight %, whereas its organic matter content is within the range of about 65 to about 35 weight %, on a dry basis. The plastics, fabrics and fibers are petroleum derivatives and are a part of the millions of tons of petroleum products that are landfilled annually.

The disposal of automobile shredder residues in landfills has become a major environmental problem. Each year, as many as 10 to 11 million scrapped cars are shredded in North America. Since automobile shredder residue contains more and more mixed plastics materials, decomposition of landfill shredder residue may take millions of years to return to organic matter.

It has already been proposed in Published International Patent Application No. WO 88/08020 to treat by pyrolysis wastes of mixed polymeric materials derived from the demolition and grinding of cars. The pyrolysis is carried out at temperatures ranging from 300° to 800° C. under an atmosphere of inert gas, such as nitrogen. The material used as feedstock comprises rubber, plastics, wood, metals and inert substances. The heat treatment of such a material at a pressure of 760 mm Hg or above favors the repolymerization and recondensation of organic macromolecules derived from the thermal decomposition of the rubber and plastics over the surfaces of the char-forming material and metals, thereby coating same with repolymerized and recondensed secondary products which are then charred and eventually cokefied as they are subjected to high temperatures. As a result, the metals recovered are coated with layers of coke which strongly adheres to the metal surface, thus rendering the metals unsuitable for direct recycling. The adherence of the coke of the metal surface is so strong that in order to eliminate the coke, the coated metals must be heated at temperatures above 1000° C., which renders the recovery of metals commercially unattractive.

In addition, the wood which is present in the feedstock undergoes at high temperatures decarboxylation and dehydration, producing carbon dioxide and water vapors which are oxidizing agents that can interact with the hot metals to produce metal oxides. The presence of these oxidizing agents together with the high temperature and atmospheric pressure conditions enhance undesirable chemical reactions of the metals, which alter the metal surface.

SUMMARY OF THE INVENTION

It is therefore an object of the present invention to provide a method of treating automobile shredder residue with a view to recovering commercially valuable products.

It is another object of the invention to treat automobile shredder residue in a manner such as to recover metals in non-oxidized and substantially carbon-free form suitable for direct recycling.

In accordance with the present invention, there is thus provided a method of recovering metals from automobile shredder residue, which comprises treating the shredder residue by vacuum pyrolysis to produce non-condensable gases, condensable hydrocarbon vapors and water vapor, and a solid residue containing non-oxidized metals and a carbonaceous material. The vacuum pyrolysis is carried out at a temperature in the range of about 450° to about 650° C. and under a subatmospheric pressure in the range of about 50 to about 200 mm Hg (absolute pressure) so as to thermally decompose and substantially completely vaporize organic matter adhered to the metals, while minimizing the generation of non-condensable gases and maximizing the generation of condensable hydrocarbon vapors. At least one metal is separated from the solid residue, the metal being recovered in non-oxidized and substantially carbon-free form suitable for direct recycling.

Applicant has already described in U.S. Pat. No. 4,740,270 a process for the treatment of used rubber tires by vacuum pyrolysis in a reactor to produce liquid and gaseous hydrocarbons and a solid carbonaceous material. According to this process, the pyrolysis of the tires is carried out at a temperature in the range of about 360° to about 415° C., under a subatmospheric pressure of less than about 35 mm Hg (absolute pressure) and such that gases and vapors produced in the reactor have a residence time of the order of a few seconds. As a result, pyrolytic oils are obtained in substantially maximum yield. Typically, about 60 weight % hydrocarbon oils, about 38 weight % solid carbonaceous material and about 2 weight % gaseous hydrocarbons can be produced by such a process.

Applicant has found quite unexpectedly that automobile shredder residue can also be treated by vacuum pyrolysis, but under different pyrolysis conditions than those utilized for treating used rubber tires, to produce commercially valuable products. In particular, it has been found that the residual solids obtained after pyrolysis contain significant amounts of valuable metals such as iron, copper, aluminum and zinc, and this is totally unexpected since the feed material subjected to pyrolysis has already been demetallized to a great extent. Moreover, since the pyrolysis is carried out under vacuum, any oxidizing or reactive species produced by the thermal decomposition of organic matter are removed as soon as they are formed and do not have time to react with the metal surface so that the metals are recovered in a non-oxidized state.

It has also been found quite unexpectedly that by selecting a pyrolysis temperature of about 450° to about 650° C. and a subatmospheric pressure of about 50 to about 200 mm Hg, and carrying out the pyrolysis under such selected conditions, any organic matter adhered to the metals is thermally decomposed and substantially completely vaporized, without causing excessive gasification of the residual solid carbonaceous material, thus producing more condensable hydrocarbon vapors and resulting in the recovery of substantially carbon-free metals suitable for direct recycling. A temperature below 450° C. is insufficient to convert into hydrocarbon vapors certain hard rubber-based materials and plastics which adhere to metals, whereas a temperature above 650° C. causes undesirable gasification of the carbonaceous material and formation of corrosive agents which may alter the surface of the metals. On the other hand, operating under a subatmospheric pressure in the range of about 50 to about 200 mm Hg has been found to maximize the generation of hydrocarbon vapors. A pressure above 200 mm Hg favors secondary reactions such as oxidation, cracking, repolymerization and recondensation reactions which not only degrade the value of the metals by altering their surface composition, but also produce more gases to the detriment of the more highly desirable hydrocarbon vapors.

The above findings are quite contrary to what could be expected as, according to the teaching of applicant's U.S. Pat. No. 4,740,270, operating at a temperature above 415° C. and under a subatmospheric pressure greater than 35 mm Hg would cause undesirable gasification of the residual solid carbonaceous material and promote the formation of non-condensable gases to the detriment of the condensable hydrocarbon vapors. The thermal decomposition of automobile shredder residue under vacuum is thus different than that of rubber and the vacuum pyrolysis of automobile shredder residue under the temperature and pressure conditions selected by Applicant permits the recovery of metals in non-oxidized and substantially carbon-free form, while minimizing the generation of non-condensable gases and maximizing the generation of condensable hydrocarbon vapors. The metals recovered are of a quality such that can be directly recycled.

As used herein, the expression "substantially carbon-free" is meant that very little or no char remains adhered onto the surface of the metals recovered. If there are any deposits of char on the metals recovered, the char of such deposits is extremely friable so that the deposits can be easily broken down. This is due to the presence in the char of a complex network of micropores, mesopores and macropores which are formed by the evacuation under vacuum of gases and hydrocarbon vapors through the mass of organic matter undergoing thermal decomposition. The solid carbonaceous material which is obtained as a by-product can be used as a reducing coke.

According to a preferred embodiment of the invention, the hydrocarbon vapors are condensed while separating therefrom the water vapor to water-free hydrocarbon oils. The hydrocarbon oils produced have a high calorific value and a low sulfur content, and are thus suitable for use as heating fuel.

Preferably, the pyrolysis is carried out at a temperature in the range of about 500° to about 550° C., under a subatmospheric pressure in the range of about 100 to about 150 mm Hg. The shredder residue, prior to undergoing pyrolysis, is preferably sieved with a 76.1 mm mesh U.S. sieve (3 inches) so that shreds having a mesh size of less than about 75 mm are used as feed material; coarser shreds which remain on top of the sieve may be crushed into fragments of the desired size.

The reactor used for carrying out the pyrolysis is advantageously the same type of reactor as described in applicant's aforementioned U.S. Pat. No. 4,740,270, which is a multi-tray reactor having a plurality of spaced-apart trays arranged above one another and each receiving a bed of shreds with the shreds being transported from an upper to a lower tray. The trays are heated at temperatures to provide a vertical temperature gradient between uppermost and lowermost trays with the lowermost tray being heated at a temperature higher than the uppermost tray. The shreds are thus gradually heated to the desired pyrolysis temperature while being transported towards the lowermost tray, and attain the pyrolysis temperature in a lower portion of the reactor. Preferably, the residence time of the shreds on each tray is approximately 5 minutes. The residence time of the non-condensable gases and condensable hydrocarbon and water vapors generated in the reactor is generally less than 60 seconds, preferably about 40 seconds, since above 60 seconds, the gases and vapors are subjected to a series of decomposition reactions, such as thermal cracking, depolymerization, catalytic cracking and oxidation reactions.

Such a reactor is advantageously provided with a feed inlet and an airtight feeding means for continuously feeding the shreds through the feed inlet into the reactor while preventing atmospheric air from entering into the reactor via the feed inlet. The shreds are passed through the feeding means and feed inlet into the reactor, the shreds being agglomerated into a compacted lump forming an airtight seal in the feeding means while moving in a direction towards the feed inlet, the lump of shreds being broken back into loose shreds prior to entering the reactor via the feed inlet.

Since the condensable hydrocarbon vapors and water vapor generated in the reactor, when condensed, form a mixture of water and oils from which the water is difficultly removed, it is preferable to first condense the hydrocarbon vapors having a boiling point above water boiling temperature to obtain a water-free heavy oil fraction, then to condense the water vapor together with hydrocarbon vapors having a boiling point below water boiling temperature to obtain a water-loaded light oil fraction from which water can be easily separated, and thereafter to remove the water from the water-loaded light oil fraction. To this end, the reactor is provided with a plurality of discharge outlets each associated with a respective tray for discharging the non-condensable gases, the condensable hydrocarbon vapors and the water vapor, and the gases and vapors are withdrawn from the reactor through the discharge outlets and passed through primary condenser means for condensing hydrocarbon vapors having a boiling point above water boiling temperature to obtain a water-free heavy oil fraction, and then through secondary condenser means for condensing the water vapor together with hydrocarbon vapors having a boiling point below water boiling temperature to obtain a water-loaded light oil fraction. The discharge outlets are connected via the primary and secondary condenser means to vacuum means for maintaining the subatmospheric pressure in the reactor and causing the gases and vapors to flow out of the reactor through the discharge outlets.

Since the solid residue which is discharged from the reactor is very hot, the metals contained therein may be oxidized when the hot solid residue is exposed to the atmosphere; in addition, the carbonaceous material will undergo spontaneous combustion. In order to prevent such oxidation, the solid residue is preferably subjected to a two-stage cooling prior to being exposed to atmospheric air. Thus, according to a preferred embodiment, the solid residue is withdrawn from the reactor through a solid discharge outlet while preventing atmospheric air from entering into the reactor via the solid discharge outlet, and is subjected to the desired two-stage cooling prior to being exposed to atmospheric air. Preferably, a barometric column is connected to the solid discharge outlet by conveyor means for conveying the solid residue from the solid discharge outlet to the barometric column, the barometric column having a water head with a height of at least 10 meters for preventing atmospheric air from entering into the reactor via the solid discharge outlet. The solid residue is transported from the solid discharge outlet to the barometric column and then passed through the barometric column to cross the water head, the solid residue being cooled to a first predetermined temperature while being conveyed to the barometric column, and thereafter further cooled in the barometric column to a second predetermined temperature below the first predetermined temperature. For example, the first predetermined temperature may be about 80° C. and the second predetermined temperature about 50° C.

The process according to the invention affords an economic solution to the problem of disposing of automobile shredder residue.

BRIEF DESCRIPTION OF THE DRAWINGS

Further features and advantages of the invention will become more readily apparent from the following description of preferred embodiments as illustrated by way of example in the accompanying drawings, in which the single figure is a schematic illustration of a vacuum pyrolysis plant for treating automobile shredder residue, according to the invention.

DESCRIPTION OF PREFERRED EMBODIMENTS

The vacuum pyrolysis plant illustrated comprises a multi-tray reactor 10 for pyrolysing under vacuum automobile shredder residue 12, a pretreatment and transport unit 14 for pre-treating the shredder residue 12 and transporting same to the reactor 10, primary and secondary condenser units 16 and 16' for condensing hydrocarbon vapors generated in the reactor 10 to obtain heavy and light oil fractions, a transport and cooling unit 18 for transporting and cooling the residual solids 20 discharged from the reactor 10 and a metal recovery treatment unit 22 for extracting metals from the residual solids 20. The unit 14 includes a first belt conveyor 24 for transporting the shredder residue 12 consisting of shreds to a vibrating 76.1 mm mesh U.S. sieve (3 inches) 26. The shreds passing through the sieve 26 and having a mesh size less than about 75 mm fall onto a second belt conveyor 28 having inclined and horizontal sections 30 and 32. The coarser shreds which remain on top of the sieve 26 are sent to a crusher 34 where they are crushed into fragments of the desired size, which also fall onto the inclined section 30 of the belt conveyor 28. As the shreds carried by the inclined section 30 of the belt conveyor reach the horizontal section 32 and are being transported by the latter, they pass underneath a magnetic separator 36 which separates ferrous metals from the shreds prior to being charged into the hopper 38 of the reactor 10. The ferrous metals separated by the magnetic separator 36 are sent to the metal recovery treatment unit 22.

The reactor 10 is provided with an air-tight feeding system 40 for continuously feeding the shreds charged into the hopper 38, through the feed inlet 42 into the reactor 10, while preventing atmospheric air from entering into the reactor. The feeding system 40 comprises a counter-rotating screw extruder 44 and a shredder 46 arranged between the feed inlet 42 and extruder 44. The shreds which are charged into the hopper 38 are agglomerated by the extruder 44 into a compacted lump forming an air-tight seal while being conveyed to the shredder 46. A lubricating oil is injected into the extruder 44 to reduce friction between the compacted lump of shreds and the inner wall surface of the extruder. The lump is then broken back into loose shreds by the shredder 46 prior to entering the reactor 10 via the feed inlet 42.

The reactor 10 has a plurality of spaced-apart heated trays 48 arranged above one another and each receiving a bed of shreds charged into the reactor and transported from an upper to a lower tray by conventional means (not illustrated), for subjecting the shreds to pyrolysis. The trays 48 are heated at temperatures to provide a vertical temperature gradient between the uppermost and lowermost trays with the lowermost tray being heated at a temperature higher than the uppermost tray. Typically, the uppermost tray is heated at about 350° C. the lowermost tray, on the other hand, is heated at a temperature between about 450° and about 650° C., preferably at about 550° C. The heating of the trays 48 and the residence time of the shreds thereon are such that the shreds when reaching the lower portion of the reactor (i.e. the two lowermost trays) are heated at a temperature of about 450° to about 650° C., preferably at about 500° to about 550° C.

The reactor 10 is also provided with a plurality of discharge outlets 50 each associated with a respective tray 48 for discharging the non-condensable gases and condensable hydrocarbon vapors and water vapor generated in the reactor. The discharge outlets 50 are connected via the primary and secondary condenser units 16 and 16' to a vacuum pump 52 for maintaining subatmospheric pressure in the reactor 10 and causing the gases and vapors to flow out of the reactor through the discharge outlets. A subatmospheric pressure in the range of about 50 to about 200 mm Hg is maintained in the reactor 10.

The primary and secondary condenser units 16 and 16', through which the non-condensable gases and condensable hydrocarbon vapors and water vapor are passed, are adapted to condense the hydrocarbon vapors and water vapor to obtain a water-free heavy oil fraction and a water-loaded light oil fraction. The gases and vapors discharged from the reactor 10 through the outlets 50 are sent via line 53 to the primary condenser unit 16. The condenser unit 16 comprises a packed bed tower 54 containing a packing 56 of Raschigs rings onto which are sprayed fine oil droplets having a temperature in the range of about 60° to about 100° C., obtained by recirculating a portion of the oil condensed in the tower 54 via line 58, pump 60, line 62, heat exchanger 64 where the oil is cooled to a temperature of 60°–100° C. and then via line 66 to spray nozzle 68. As the gases and vapors introduced via line 52 ascend the tower 54 and pass through the packing 56 of Raschigs ring, they encounter the cooled oil droplets sprayed by the nozzle 68, resulting in condensation of the hydrocarbon vapors with a boiling point about 60°–100° C. under the operating subatmospheric pressure conditions, thereby obtaining a water-free heavy oil fraction which accumulates at the bottom of the tower 54. The heat exchange between the hydrocarbon vapors and the cooled oil droplets is promoted by the high surface area provided by the Raschigs rings in the packing 56. The portion of the heavy oil fraction which is not recirculated is sent via line 70 to the storage tank 72.

The non-condensable gases, water vapor and the hydrocarbon vapors with a boiling point below 60°–100° C. leaving the tower 54 are sent via line 74 to the secondary condenser unit 16'. The condenser unit 16' is similar to the unit 16, but operates at a lower temperature, e.g. about 20° to about 40° C., and thus serves to condense the water vapor and the remaining hydrocarbon vapors having a boiling point below 60°–100° C. The unit 16' comprises a spray tower 54' containing a packing 56' of Raschigs rings onto which are sprayed fine droplets of oil and water having a temperature of 20°–40° C., obtained by recirculating a portion of the oil and water condensed in the tower 54' via line 58', pump 60', line 62', heat exchanger 64' where the oil and water are cooled to a temperature of 20°–40° C. and then via line 66' to spray nozzle 68'. The oil condensed in the tower 54' is thus a light oil fraction having a boiling point below 60°–100° C. under the operating subatmospheric pressure conditions, and it is loaded with water. Part of the light oil fraction and water which accumulate at the bottom of the tower 54' is sent via line 58', pump 60' and line 70' to a decanter 76 where the light oil fraction and water are separated from one another by decantation. The separated water is sent via line 78 to a water treatment unit (not shown), whereas the water-free light oil fraction obtained is sent via line 80 to the storage tank 82.

The non-condensable gases leaving the tower 54' are sent via line 84, vacuum pump 52 and line 86 to a gas-liquid separator 88 which separates residual moisture and atomized oil droplets from the non-condensed gases. The oil and water separated by the gas-liquid separator 88 are sent via line 90 to the decanter 76. The purified gases are sent via line 92 to combustion utilities (not shown).

The residual solids which are discharged through the bottom outlet 94 of the reactor 10 are subjected to a two-stage cooling, prior to being exposed to the atmospheric air. To this end, the residual solids are first cooled to about 80° C. while being transported by a screw conveyor 96 having a water-cooled section 98, to a bottom-opened barometric colume 100. The section 98 of the conveyor is cooled by means of a cooling sleeve 102 through which water circulates. The column 100 has a water head 104 with a height of at least 10 meters to prevent atmospheric air from entering the reactor 10 via the bottom outlet 94. The water inside the column 100 is maintained at a temperature of about 50° C. by means of a cooling sleeve 106 surrounding the column. The bottom of the column 100 is immersed in a water bath 108 contained in a top-opened reservoir 110. As the residual solids fall from the top of the conveyor 96 into the column 100 and cross the water head 104, they are further cooled to a temperature of about 50° C. The residual solids exiting the bottom of the column 100 fall onto a belt conveyor 112 having a horizontal section 114 submerged in the water bath 108 and disposed underneath the column 100. The wet solids are then transported by the conveyor 112 out of the water bath 108 into the atmospheric air and dumped to form a heap of wet residual solids 20. These residual solids are thereafter sent to the metal recovery treatment unit 22 so as to recover metals contained in the residual 10 solids. The metals are extracted from the residual solids 20 in the unit 22 by conventional methods, for example, by gravity separation.

Samples of automobile shredder residue (ASR) of different composition and designated ASR Nos 1, 2 and 3 were subjected to vacuum pyrolysis using the installation illustrated in the drawings. The vacuum pyrolysis was carried out under a subatmospheric pressure of about 100 mm Hg and the average final temperature reached by the shreds in the lower portion of the reactor 10 was about 500° C. The feedstock characteristics and pyrolysis yields (wt. % on an as-received basis) are reported in Tables 1 and 2, respectively:

TABLE 1

|  | ASR N° 1 | ASR N° 2 | ASR N° 3 |
| --- | --- | --- | --- |
| Moisture (%) | 0.6 | 1.89 | 1.74 |
| Inorganic Content | 38.2 | 57.2 | 49.3 |
| Organic Content (%) | 61.2 | 40.9 | 49.0 |
| Bulk density (lb/ft$^3$) | 26 | 19 | 22 |

TABLE 2

|  | ASR N° 1 | ASR N° 2 | ASR N° 3 |
| --- | --- | --- | --- |
| Residual solids | 51.2 | 64.4 | 57.6 |
| Oils | 36.6 | 14.2 | 21.7 |
| Pyrolytic water | 8.4 | 15.4 | 15.7 |
| Moisture | 0.6 | 1.9 | 1.7 |
| Gases | 3.2 | 4.1 | 3.3 |

As it is apparent from Table 2, the residual solids and hydrocarbon oils represent the major products of the pyrolysis. On the other hand, low yields of non-condensable gases are maintained. Analysis of the residual solids provided the following results:

TABLE 3

|  | ASR N° 1 | ASR N° 2 | ASR N° 3 |
| --- | --- | --- | --- |
| Moisture | 1.7 | 0.7 | 0.8 |
| Iron | 7.2 | 15.4 | 20.7 |
| Copper | 3.0 | 0.8 | 2.0 |
| Aluminum | 1.4 | 2.3 | 1.3 |
| Zinc | 0.8 | 0.9 | 0.8 |
| Non-ferrous alloys | 16.6 | 5.9 | 8.5 |
| Inorganic matters | 45.3 | 63.4 | 49.6 |
| Total inorganics | 74.3 | 88.7 | 82.9 |
| Char | 25.7 | 11.3 | 17.1 |
|  | 100.0 | 100.0 | 100.0 |

The inorganic matters reported in Table 3 included metals which were further identified in Table 4 hereinbelow, as well as other unidentified metals, metal oxides, fiberglass, glass, sand, stones, etc.

TABLE 4

| Concentration (mg/g of inorganic matters) | ASR N° 1 | ASR N° 2 | ASR N° 3 |
| --- | --- | --- | --- |
| Aluminum | 29.0 | 26.8 | 18.5 |
| Cadmium | 0.065 | 0.029 | 0.041 |

TABLE 4-continued

| Concentration (mg/g of inorganic matters) | ASR N° 1 | ASR N° 2 | ASR N° 3 |
|---|---|---|---|
| Chromium | 0.33 | 0.21 | 0.32 |
| Copper | 2.3 | 0.88 | 1.9 |
| Iron | 121 | 180 | 230 |
| Lead | 5.7 | 3.1 | 4.1 |
| Nickel | 0.50 | 0.22 | 0.44 |
| Zinc | 18.7 | 7.3 | 11.8 |

As it is apparent from Tables 3 and 4, the residual solids obtained after pyrolysis of automobile shredder residue contain significant amounts of aluminum, copper, iron, lead and zinc, which are valuable metals. The metals recovered are of a quality such that they can be directly recycled.

The pyrolytic oils produced were also analyzed. The results are reported in the following Table 5:

TABLE 5

| | ASR N° 1 | ASR N° 2 | ASR N° 3 |
|---|---|---|---|
| Moisture (%) | 8.10 | 36.38 | 21.01 |
| Elemental analysis (%/weight): | | | |
| Carbon | 87.31 | 75.83 | 81.29 |
| Hydrogen | 10.94 | 10.36 | 11.37 |
| Nitrogen | 0.98 | 2.46 | 2.63 |
| Sulfur, total | 0.34 | 0.27 | 0.25 |
| Oxygen (by diff.) | 0.43 | 11.08 | 4.46 |
| | 100% | 100% | 100% |
| Concentration ($\mu$g/g of oil): | | | |
| Aluminum | 5.8 | 9.4 | 6.9 |
| Cadmium | 2.9 | 11.3 | 12.4 |
| Chromium | 5.0 | 2.4 | 1.7 |
| Copper | 1.8 | 3.8 | 3.3 |
| Iron | 444 | 1293 | 312 |
| Nickel | 2.9 | 4.7 | 3.5 |
| Lead | 2.9 | 24.4 | 11.1 |
| Zinc | 11.5 | 56.4 | 24.2 |
| Gross Calorific Value (cal/g) | 9650 | 8990 | 9780 |

As may be seen from Table 5, the pyrolytic oils derived from automobile shredder residue have a high calorific value and a low sulfur content, and are thus suitable for use as heating fuel. The physical properties of the pyrolytic oil derived from ASR No 1 are summarized in the following Table 6:

TABLE 6

| Physical Properties | Method | ASR N° 1 |
|---|---|---|
| API | ASTM-D-1298 | 19.8 |
| Density at 15° C. | ASTM-D-1298 | 0.9347 |
| Flash Point (°) | ASTM-D-93 | 62 |
| Pour Point (°) | ASTM-D-97 | +30 |
| Viscosity CST 50° C. | ASTM-D-445 | 48.35 |
| Ash (wt. %) | ASTM-D-482 | 0.09 |
| Compatibility/Stability | ASTM-D-2781/4740 | 50 |

In view of the above physical properties of the pyrolytic oil and the low sulfur content thereof (see Table 5), such a pyrolytic oil can be advantageously blended with crude oil to reduce fuel oil sulfur content, thereby reducing $SO_2$ emission when the fuel oil is burnt.

Analysis of the non-condensable gases provided the following results (vol. % on a dry basis):

TABLE 7

| | ASR N° 1 | ASR N° 2 | ASR N° 3 |
|---|---|---|---|
| Hydrogen ($H_2$) | 50.70 | 46.00 | 47.69 |
| Methane ($CH_4$) | 9.53 | 12.56 | 9.31 |
| Carbon monoxide (CO) | 2.47 | 10.43 | 6.71 |
| Carbon dioxide ($CO_2$) | 15.97 | 23.05 | 24.68 |
| Ethene ($C_2H_4$) | 1.72 | 1.61 | 1.81 |
| Ethane ($C_2H_6$) | 3.46 | 1.72 | 2.15 |
| Propene ($C_3H_6$) | 2.88 | 1.67 | 2.96 |
| Propane ($C_3H_8$) | 1.61 | 0.34 | 0.76 |
| Butene ($C_4H_8$) | 5.56 | 0.67 | 1.16 |
| Butane ($C_4H_{10}$) | 0.97 | 0.22 | 0.37 |
| Acetone ($CH_3COCH_3$) | 0.89 | 0.22 | 0.41 |
| Pentane ($C_5H_{12}$) | 1.67 | 0.51 | 0.80 |
| Ether ($C_4H_{10}O$) | 0.38 | 0.22 | 0.20 |
| Others | 2.19 | 1.51 | 0.99 |
| Mean Molecular Weight (g/mol) | 20.94 | 19.53 | 20.45 |
| Gross Calorific Value (cal/g) | 8000 | 5000 | 5500 |

The high hydrogen content of the gases is due to the high temperature at which the pyrolysis is carried out. The gases have a good calorific value.

The reduction in volume of the automobile shredder residue resulting from the vacuum pyrolysis thereof was also calculated on the basis of the density values before and after pyrolysis and the pyrolysis yields of residual solids for each sample. The reduction in volume was as follows:
ASR No 1: 66%
ASR No 2: 73%
ASR No 3: 71%

The automobile shredder residue therefore undergoes a significant reduction in volume when subjected to vacuum pyrolysis. This enables the residual solids obtained after pyrolysis to be more readily disposed of as landfills, after metal recovery.

Finally, the residual solids were tested to determine whether the governmental leaching regulations were met. The metal analysis in the leachates from the residual solids as compared with the MENVIQ (Ministry of Environment of Quebec, Canada) regulations provided the following results:

TABLE 8

| Concentration ($\mu$g/g) | MENVIQ Rule (1) | ASR N° 1 | ASR N° 2 | ASR N° 3 |
|---|---|---|---|---|
| Aluminum | — | 0.085 | 0.77 | 0.099 |
| Cadmium | 2.0 | 0.73 | 0.10 | 0.077 |
| Chromium | 5.0 | 0.0024 | 0.0025 | 0.0025 |
| Copper | 10 | 0.083 | 0.12 | 0.036 |
| Iron | — | 0.034 | 0.54 | 0.071 |
| Nickel | 10 | 5.0 | 3.6 | 7.5 |
| Lead | 5.0 | 1.9 | 1.8 | 0.19 |
| Zinc | 10 | 396 | 169 | 73 |

(1) Rule Q-2. r. 12.1

As may be seen from Table 8, apart from a high zinc content, the leachates do meet governmental regulations. Therefore, the residual solids can be safely disposed of as landfills without being hazardous to the environment, provided of course that the zinc content be first reduced to a value lower than 10 $\mu$g/g.

I claim:
1. A method of recovering metals from automobile shredder residue, which comprises the steps of:
   a) treating said shredder residue by vacuum pyrolysis to produce non-condensable gases, condensable hydrocarbon vapors and water vapor, and a solid residue containing non-oxidized metals and a carbonaceous material, said vacuum pyrolysis being carried out at a temperature in the range of about 450° to about 650° C. and under a subatmospheric pressure in the range of about 50 to about 200 mm Hg so as to thermally decompose and substantially completely vaporize organic matter adhered to said metals, b) separating at least one metal from said solid residue, said metal being recovered in nonoxidized and substantially carbon-free form suitable for direct recycling.

2. A method as claimed in claim 1, wherein said temperature is in the range of about 500° to about 550° C.

3. A method as claimed in claim 2, wherein said subatmospheric pressure is in the range of about 100 to about 150 mm Hg.

4. A method as claimed in claim 1, wherein said shredder residue consists of shreds having a mesh size less than about 75 mm.

5. A method as claimed in claim 4, wherein step (a) is carried out in a multi-tray reactor having a plurality of spaced-apart heated trays arranged above one another and each receiving a bed of said shreds with said shreds being transported from an upper to a lower tray, and wherein said non-condensable gases, said condensable hydrocarbon vapors and said water vapor have a residence time less than about 60 seconds in said reactor.

6. A method as claimed in claim 5, wherein said trays are heated at temperatures to provide a vertical temperature gradient between uppermost and lowermost trays with the lowermost tray being heated at a temperature higher than the uppermost trays, whereby said shreds while being transported towards said lowermost tray are gradually heated to said pyrolysis temperature and attain said pyrolysis temperature in a lower portion of said reactor.

7. A method as claimed in claim 6, wherein said uppermost and lowermost trays are heated at about 350° C. and about 550° C., respectively, and wherein the residence time of said shreds on said heated trays is such that said pyrolysis temperature is between about 500° and about 550° C.

8. A method as claimed in claim 5, wherein said reactor is provided with a feed inlet and an air-tight feeding means for continuously feeding said shreds through said feed inlet into said reactor while preventing atmospheric air from entering into said reactor via said feed inlet, and wherein said shreds are passed through said feeding means and said feed inlet into said reactor, said shreds being agglomerated into a compacted lump forming an air-tight seal in said feeding means while moving in a direction towards said feed inlet, said lump of shreds being broken back into loose shreds prior to entering said reactor via said feed inlet.

9. A method as claimed in claim 1, further including the step of condensing said hydrocarbon vapors while separating therefrom said water vapor to obtain water-free hydrocarbon oils.

10. A method as claimed in claim 9, wherein said condensing step is carried out by first condensing hydrocarbon vapors having a boiling point above water boiling temperature to obtain a water-free heavy oil fraction, then condensing said water vapor together with hydrocarbon vapors having a boiling point below water boiling temperature to obtain a water-loaded light oil fraction, and thereafter removing water from said water-loaded light oil fraction.

11. A method as claimed in claim 10, wherein said heavy oil fraction is obtained by condensing hydrocarbon vapors having a boiling point above about 60° to about 100° C. under said subatmospheric pressure, and said light oil fraction is obtained by condensing hydrocarbon vapors having a boiling point below about 60° to about 100° C. under said subatmospheric pressure.

12. A method as claimed in claim 5, further including the step of condensing said hydrocarbon vapors while separating therefrom said water vapor to obtain water-free hydrocarbon oils.

13. A method as claimed in claim 12, wherein said reactor is provided with a plurality of discharge outlets each associated with a respective tray for discharging said non-condensable gases, said condensable hydrocarbon vapors and said water vapor, and wherein said gases and vapors are withdrawn from said reactor through said discharge outlets and passed through primary packed bed condenser means for condensing hydrocarbon vapors having a boiling point above water boiling temperature to obtain a water-free heavy oil fraction, and then through secondary packed bed condenser means for condensing said water vapor together with hydrocarbon vapors having a boiling point below water boiling temperature to obtain a water-loaded light oil fraction, said discharge outlets being connected via said primary and secondary packed bed condenser means to vacuum means for maintaining said subatmospheric pressure in said reactor and causing said gases and vapors to flow out of said reactor through said discharge outlets.

14. A method as claimed in claim 13, wherein water is removed from said water-loaded light oil fraction to obtain a water-free light oil fraction.

15. A method as claimed in claim 1, wherein said solid residue is subjected to a two-stage cooling prior to being exposed to atmospheric air.

16. A method as claimed in claim 15, wherein said solid residue is cooled first to about 80° C. and then to about 50° C.

17. A method as claimed in claim 5, wherein said reactor is provided with a discharge outlet for discharging said solid residue, and wherein said solid residue is withdrawn from said reactor through said discharge outlet while preventing atmospheric air from entering into said reactor via said discharge outlet, and is subjected to a two-stage cooling prior to being exposed to atmospheric air.

18. A method as claimed in claim 17, wherein a barometric column is connected to said discharge outlet by conveyor means for conveying said solid residue from said discharge outlet to said barometric column, said barometric column having a water head with a height of at least 10 meters for preventing atmospheric air from entering into said reactor via said discharge outlet, and wherein said solid residue is transported from said discharge outlet to said barometric column and then passed through said barometric column to cross said water head, said solid residue being cooled to a first predetermined temperature while being conveyed to said barometric column, and thereafter further cooled in said barometric column to a second predetermined temperature below said first predetermined temperature.

19. A method as claimed in claim 18, wherein said first predetermined temperature is about 80° C. and said second predetermined temperature is about 50° C.

20. A method as claimed in claim 1, wherein said automobile shredder residue has an inorganic matter content in the range of about 35 to about 65 weight % and an organic matter content in the range of about 65 to about 35 weight %, on a dry basis.

21. A method as claimed in claim 1, wherein the temperature and pressure conditions in step (a) are such as to minimize generation of said non-condensable gases and maximize generation of said condensable hydrocarbon vapors.

* * * * *